Feb. 20, 1945.  C. R. RANEY ET AL  2,369,754
CONVEYER
Filed March 22, 1943  3 Sheets-Sheet 2

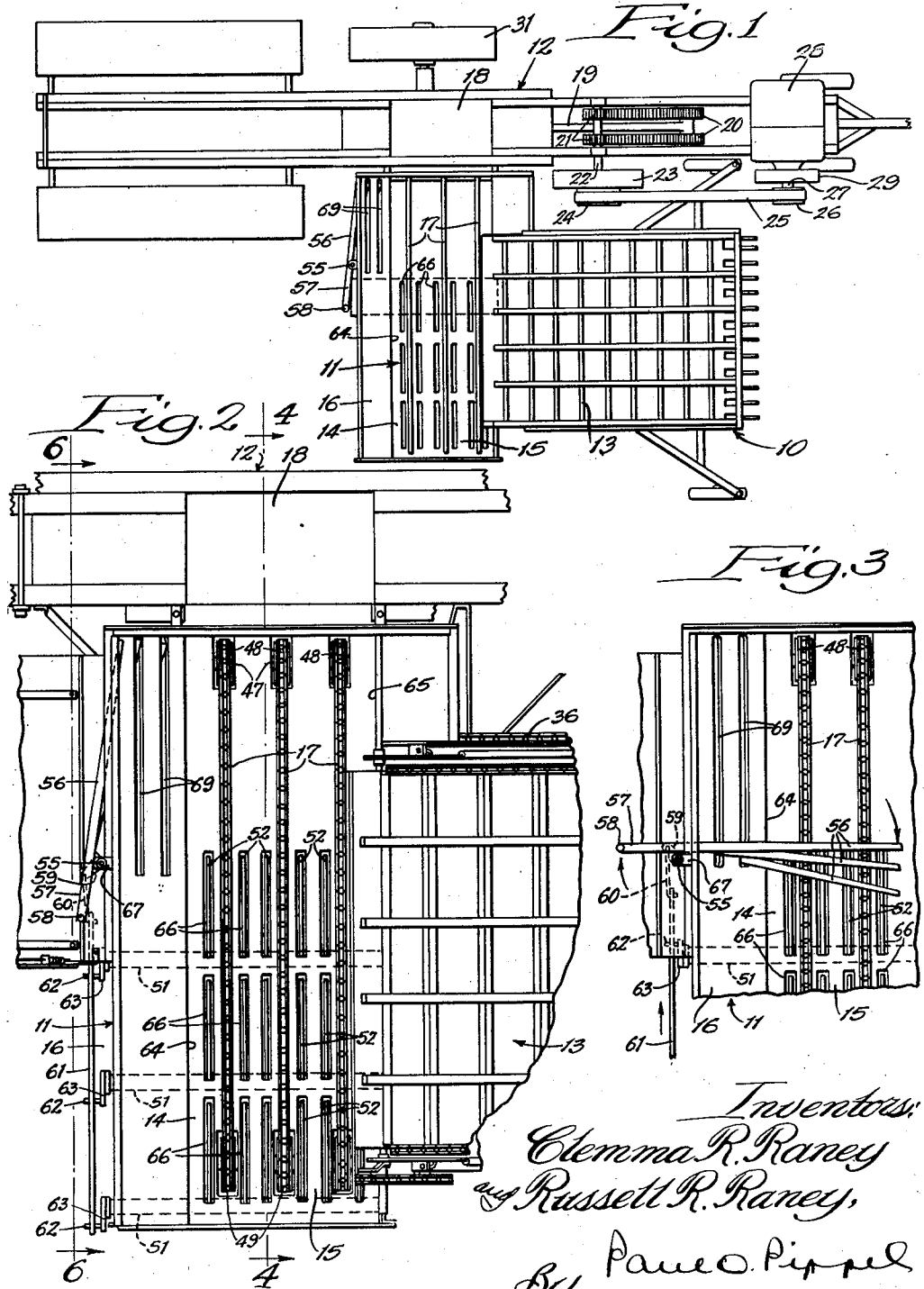

Inventors:
Clemma R. Raney
and Russell R. Raney,
By Paul O. Pippel
Attorney.

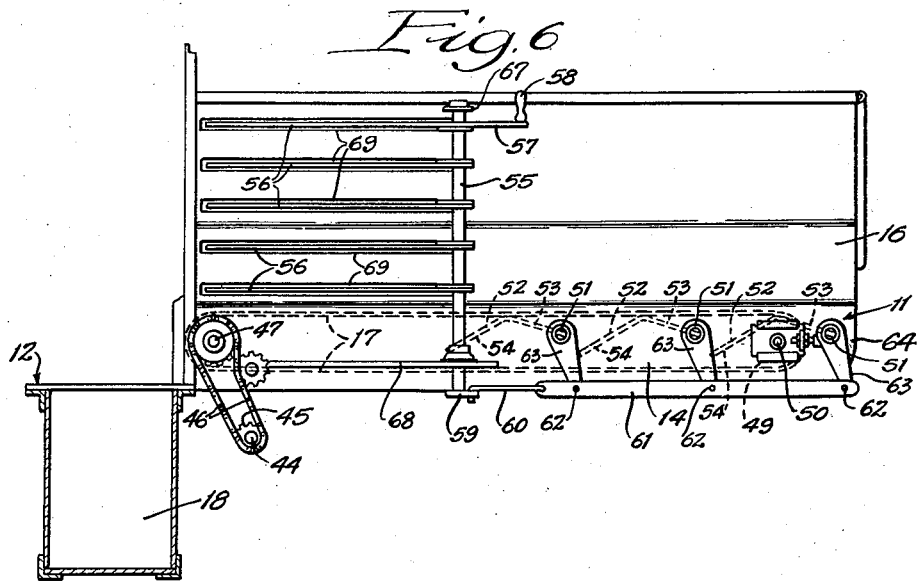
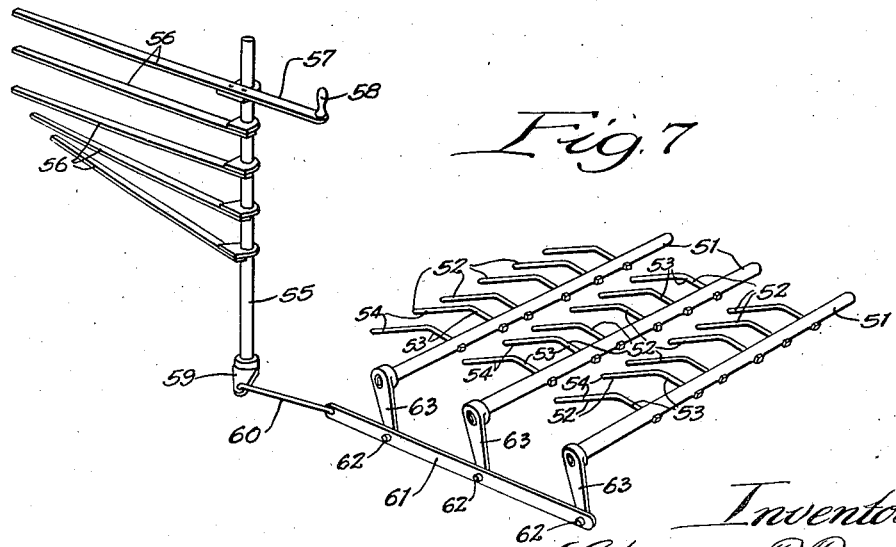

Patented Feb. 20, 1945

2,369,754

UNITED STATES PATENT OFFICE 2,369,754

CONVEYER

Clemma R. Raney, Riverside, and Russell R. Raney, La Grange, Ill., assignors to International Harvester Company, a corporation of New Jersey Application March 22, 1943, Serial No. 480,010

18 Claims. (Cl. 100—25)

This invention relates to a conveyer. More specifically it relates to a means for stopping the flow of material along the conveyer.

In balers, either of the stationary type or of the traveling pick-up type, it is customary to provide a cross-conveyer which moves crops or other material to a baling chamber. At certain intervals blocks must be inserted in the baling chamber to separate the material therein into bales. The operation of inserting blocks requires that the flow of material from the conveyer into the baling chamber be temporarily stopped. Raney Patent No. 2,252,354, dated August 12, 1941, shows a conveying means leading to a baling chamber, which means involves a pair of conveyers and a gate. When a block is to be inserted in the baling chamber, the conveyer more remote from the baling chamber is stopped, the conveyer adjacent the baling chamber continues to run, and the gate is swung across the last-mentioned conveyer into a position between the conveyers. This arrangement accomplishes very well the necessary stopping of flow of material into the baling chamber and the separation of material in the chamber from that on the conveyer, but it is somewhat complicated, because it involves two conveyers and a clutch for stopping the remote conveyer. The present application has to do with an arrangement of parts which, like that of the Raney patent, will effect a stopping of flow of material into the baling chamber and separation of material and will yet be somewhat simpler than the arrangement of the Raney patent.

An object of the present invention is to provide an improved conveyer.

A further object is to provide an improved conveyer for use with a crop-treating device.

Another object is the provision of an improved conveyer for use with a baler.

Still another object is the provision of a means for stopping flow of material along a conveyer.

Still another object is to provide stop means for a conveyer used with a crop-treating device.

Another object is to provide a stop for a conveyer used with a baler.

Other objects will appear from the disclosure.

According to the present invention a conveyer comprising a platform and a conveying element moving therealong moves crops or other material to a crop-treating device such as a baler. For stopping of flow of material along the conveyer, the conveying elements themselves are not stopped, but a gate is swung from alongside the conveyer to across the conveyer at a point near but spaced from the crop-treating device, and fingers are moved from beneath the platform to above the platform to raise the crops or other material from engagement with the conveying elements on the platform, so that the crops are held in lifted position behind the gate.

In the drawings:

Figure 1 is a plan view of a pick-up baler, on which the improved conveying means of the present invention is employed;

Figure 2 is a plan view similar to Figure 1 but showing an enlarged scale portion of what is shown in Figure 1;

Figure 3 is a plan view of a fragment of what is shown in Figure 2, with certain parts in a different position;

Figure 6 is a sectional view taken on the line 6—6 of Figure 2; and

Figure 7 is a perspective view showing the gate and lifting fingers which comprise the essence of the present invention.

Figure 4:
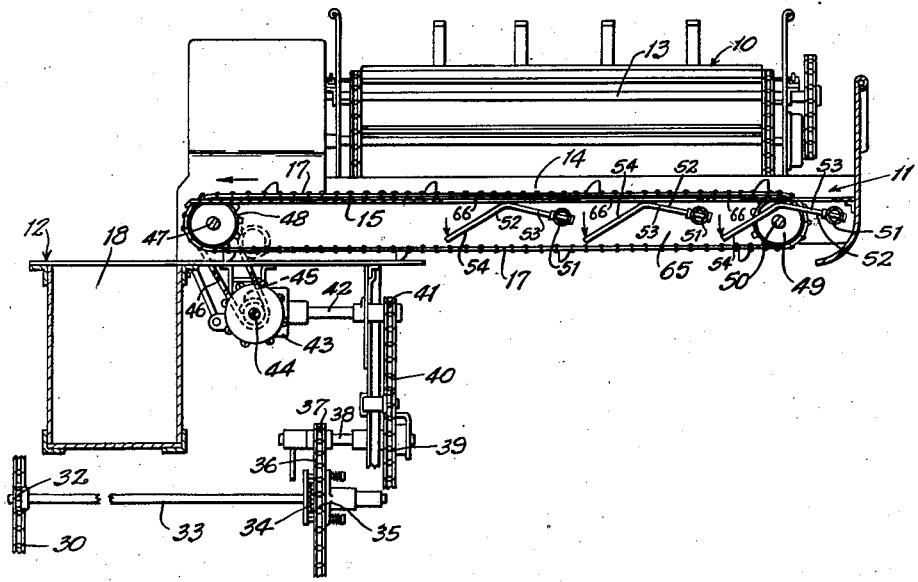
Figure 4 is a sectional view taken on the line 4—4 of Figure 2.

Figure 1 shows a pick-up baler which comprises essentially a pick-up unit 10, a cross-conveyer 11, and a baling unit 12. The pick-up unit 10 includes a pick-up cylinder, not shown, and an elevating conveyer 13. The cross-conveyer 11 comprises a platform 14 having a floor 15 and a back 16, and a plurality of spaced conveying chains 17 extending along the floor 15. The baling unit 12 includes a baling chamber 18, shown in Figures 4, 5, and 6, and a baling plunger, not shown, mounted for reciprocation in the baling chamber 18. Connected to the baling plunger is a pitman 19 connected in turn by a crank-pin to a pair of bull gears 20. The bull gears 20 mesh with a pair of pinions 21 secured upon a shaft 22, to which are also secured belt pulleys 23 and 24. A belt 25 connects the one pulley 24 and a third belt pulley 26 secured upon a shaft 27 extending from an engine 28. A fourth belt pulley 29 is also secured upon the shaft 27. The engine 28 acts, through the shaft 27, belt pulleys 24 and 26, belt 25, shaft 22, pinions 21, bull gears 20, and pitman 19, to cause the baling plunger to reciprocate in the baling chamber 18.

Figure 5:
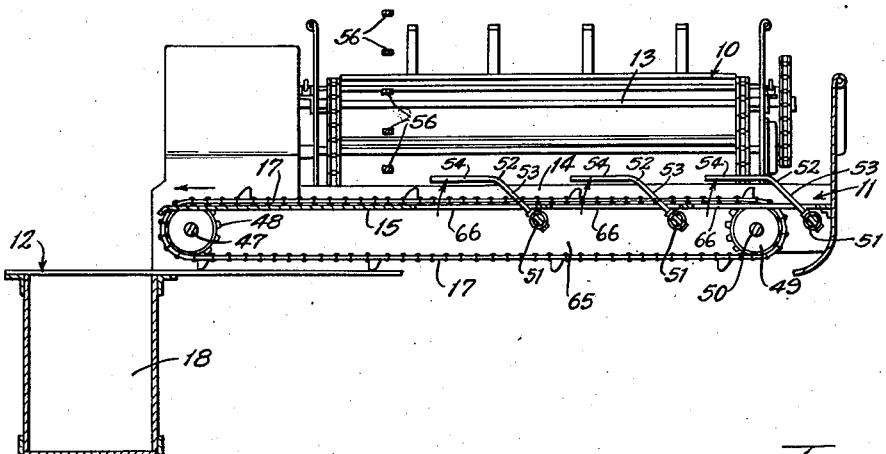
Figure 5 is a sectional view taken on the line 4—4 of Figure 2 but showing certain parts in a different position from that of Figure 4.

As seen in Figure 4, a sprocket chain 30, connected in a manner not shown to a ground wheel 31, meshes with a sprocket 32 secured to a shaft 33. Secured upon the shaft 33 is a clutch 34 to which is secured a sprocket 35, which is engaged by a sprocket chain 36, which in turn engages a sprocket 37 upon a jack-shaft 38. Secured to the jack-shaft 38 is a sprocket 39 engaged by a sprocket chain 40 which also engages a sprocket 41 secured upon a second jack-shaft 42. The jack-shaft 42 extends into a gear-box 43 from which extends a stub shaft 44. To the stub shaft 44 is secured a sprocket 45 which is engaged by a sprocket chain 46 which also engages a sprocket, not shown, secured upon a shaft 47. Also secured to the shaft 47 is a plurality of sprockets 48, which are engaged by the plurality of spaced conveying chains 17. The rotation of the ground wheel 31, due to the travel of the pick-up baler over the ground, acts through the mechanism just described to cause the conveyer chains 17 to move over the floor 15 toward the baling chamber 18 and thus to move material over the floor 15 toward the baling chamber. The sprocket chain 36 extends forwardly to the front end of the pick-up unit 10 to drive the pick-up cylinder and the elevating conveyor 13 in a manner not shown. The drive of the pick-up cylinder, the elevating conveyer, and the conveyer chains 17 has not been shown in greater detail, since it forms no part of the present invention. It is sufficient for the purposes of the present invention to state that the conveyer chains 17 are continuously driven. A plurality of idler sprockets 49 mounted upon a shaft 50 engage the inside of the conveyer chains 17 at the end remote from the baling chamber 18.

Figure 7 illustrates the important part of the present application. As seen in this figure, there is provided a plurality of spaced, parallel, rock-shafts 51, to each of which is secured a plurality of bent fingers 52. The fingers on each rock-shaft are spaced from one another and the fingers on all the rock-shafts extend in the same direction therefrom, namely, to the left as viewed in Figure 7. Each bent finger 52 comprises a first straight portion 53 by which the finger 52 is secured to a rock-shaft 51, and a second straight portion 54 extending at a slight angle to the portion 53. Figure 7 also shows a vertical rock-shaft 55 spaced somewhat to the left of one end of the rock-shafts 51. To the rock-shaft 55 is secured a plurality of raking or sweeping members 56, which extend horizontally therefrom in vertically spaced relation to one another. The upper member 56 has an extension 57 on which is mounted a handle 58, by which the rock-shaft 55 is moved angularly and the position of the members 56 is controlled. Secured to the lower end of the rock-shaft 55 is an arm 59, to which is connected one end of a link 60, the other end being connected to one end of a bar 61. Pivotally connected in spaced points of the bar 61 are projections 62 upon the ends of arms 63 secured to the rock-shafts 51. The arms 59 and 63, the link 60, and the bar 61 interconnect the rock-shafts 51 and 55, so that angular movement of the crank 58 not only shifts the members 56 mounted upon the rock-shaft 55, but also moves the rock-shafts 51 angularly to shift the fingers 52. The rock-shafts 51 are positioned below the floor 15 and are mounted at one end in an extension 64 of the back 16 of the platform 14 below the floor 15. The other ends of the rock-shafts 51 are mounted in a vertical flange 65 extending downwardly from the front side of the floor 15. Figure 4 shows the fingers or elements 52 secured to the rock-shafts 51 in the position they occupy when crops or other material is being conveyed over the floor 15 by the conveyer chains 17 to the baling chamber 18. In this position the fingers 52 are below the floor 15 and do not interfere with the movement of material over the conveyer 15. Positioned directly above the various fingers 52 is a plurality of elongated slots 66, through which the fingers 52 are projected to the position shown in Figure 5 when the rock-shafts 51 are moved angularly by movement of the handle 58. In this position they extend well above the level of the floor 15 and the straight portions 54 extend approximately parallel to the floor 15 and in spaced relation thereto. The rock-shaft 55 is mounted in a bracket 67 secured to the rear of the back 16 and in a platform 68 extending from the rear of the back 16. When material is being moved over the floor 15 by the conveyer chains 17 to the baling chamber 18, the sweeping or raking members 56 secured to the rock-shaft 55 extend generally alongside the floor 15 and rearwardly of the platform back 16. In this position they provide no interference to movement of the material over the platform 14 to the baling chamber 18. However, when the handle 58 is moved to elevate the fingers 52 to the position of Figure 5, the rock-shaft 55 is also angularly moved, so that the members 56 are shifted from the position of Figure 2 to that of Figure 3, in which they extend across the floor 15 and conveyer chains 17 approximately transversely thereto at a point near but somewhat spaced from the baling chamber 18. When it is desired to insert a block in the baling chamber 18, the handle 58 is moved so that the fingers 52 are elevated to the position of Figure 5 and the members 56 are swung to the position of Figure 3. The conveyer chains 17 continue to move along the floor 15 toward the baling chamber 18, but the fingers 52 lift the crops or other material to the right of the sweeping or raking members 56, as viewed in Figure 5, so as to lift the crops or other material out of conveying contact with the conveying chains 17 and the members 56, passing through elongated slots 69 in the platform back 16, sweep the crops or other material back from adjacent the baling chamber 18 to the position which they occupy in Figures 3 and 5. The continuously running conveyer chains 17 clear from the portion of the floor 15 to the left of the members 56 any crops or other material not swept back by the members 56. Thus, there is effected a division of the material contained in the baling chamber 18 and material eventually to be deposited therein, and a stopping of flow of material to the baling chamber. The block is then inserted. After this is done, the handle 58 is shifted back to its original position, so that the fingers 52 are depressed through the slots 66 in the floor 15 to the position of Figure 4, and the raking or sweeping members 56 are retracted through the slots 69 to the position of Figure 2. Thereupon conveying of material to the baling chamber 18 is resumed until sufficient material has accumulated therein for the insertion of another block to be required.

It is important to note from the above description that only one conveyer is required and it is unnecessary to provide a clutch for stopping the conveyer, since the conveyer runs continuously. The essential of the present invention is the provision of the lifting members 52 which raise the material positioned back of the sweeping members 56 and so cooperate with the sweeping members to hold material back of the sweeping members out of conveying contact with the conveying elements moving along the platform. It has been stated that the fingers lift the material out of conveying contact with the conveying elements. This language has been used, because it is not necessary that the material be lifted completely out of contact with the conveying elements but only that the contact of the conveying elements with the material be reduced sufficiently that the conveying is reduced to the point where the gate formed by the sweeping members can easily hold back the material behind it. The term "sweeping" has been used to describe the members 56, and they may also be considered to constitute a gate, since they hold back crops or material from the baling chamber.

The intention is to limit the invention only within the scope of the appended claims.

What is claimed is:

1. The combination with a crop-treating device and a continuously moving conveyer extending to the device for transferring by conveying contact crops to be treated to the device, of a crop-shifting mechanism, a gate, and means for simultaneously placing the gate across the conveyer to stop the movement of crops therebeyond and positioning the shifting mechanism to make it shift the crops from conveying contact with the conveyer for stopping the transferring of crops toward the device.

2. The combination with a baler and a continuously moving conveyer extending to the baler for transferring by conveying contact material to be baled to the baler, of a material-shifting mechanism, a gate, and means for simultaneously placing the gate across the conveyer to stop the movement of material therebeyond and positioning the shifting mechanism to make it shift the material from conveying contact with the conveyer for stopping the transferring of material toward the baler.

3. The combination with a crop-treating device and a continuously moving conveyer extending to the device for transferring by conveying contact crops to be treated to the device, of a crop-shifting mechanism, a gate, and means for simultaneously placing the gate across the conveyer at a point near but spaced from the device to stop the movement of crops therebeyond and positioning the shifting mechanism to make it shift the crops from conveying contact with the conveyer for stopping the transferring of crops toward the device.

4. The combination with a baler and a continuously moving conveyer extending to the baler for transferring by conveying contact material to be baled to the baler, of a material-shifting mechanism, a gate, and means for simultaneously placing the gate across the conveyer at a point near but spaced from the baler to stop the movement of material therebeyond and positioning the shifting mechanism to make it shift the material from conveying contact with the conveyer for stopping the transferring of material toward the baler.

5. The combination with a crop-treating device and a continuously moving conveyer extending to the device for transferring by conveying contact crops to be treated to the device, of a crop-shifting mechanism, a gate normally extending alongside the conveyer during transferring of crops to the device, and means for swinging the gate across the conveyer to stop the movement of crops therebeyond and for simultaneously positioning the shifting mechanism to make it shift the crops from conveying contact with the conveyer for stopping the transferring of crops toward the device.

6. The combination with a baler and a continuously moving conveyer extending to the baler for transferring by conveying contact material to be baled to the baler, of a material-shifting mechanism, a gate normally extending alongside the conveyer during transferring of material to the baler, and means for swinging the gate across the conveyer to stop the movement of material therebeyond and for simultaneously positioning the shifting mechanism to make it shift the material from conveying contact with the conveyer for stopping the transferring of material toward the baler.

7. The combination with a crop-treating device and a continuously moving conveyer extending to the device for transferring by conveying contact crops to be treated to the device, of a crop-shifting mechanism normally inoperative during transferring of crops to the device, a gate pivotally mounted at a point at the side of the conveyer near but spaced from the crop-treating device and normally extending alongside the conveyer toward the device during transferring of crops to the device, and means for swinging the gate from alongside the conveyer to across the conveyer spaced from the device, thereby to sweep crops back from the end adjacent the device and to stop the transfer of crops beyond the gate toward the device, and for simultaneously causing the crop-shifting means to shift the crops out of conveying contact with the conveyer to stop the transferring of crops toward the crop-treating device.

8. The combination with a baler and a continuously moving conveyer extending to the baler for transferring by conveying contact material to be baled to the baler, of a material-shifting mechanism normally inoperative during transferring of material to the baler, a gate pivotally mounted at a point at the side of the conveyer near but spaced from the baler and normally extending alongside the conveyer toward the baler during transferring of material to the baler, and means for swinging the gate from alongside the conveyer to across the conveyer spaced from the baler, thereby to sweep material back from the end adjacent the baler and to stop the transfer of material beyond the gate toward the baler, and for simultaneously causing the material-shifting means to shift the material out of conveying contact with the conveyer to stop the transferring of material toward the baler.

9. The combination with a crop-treating device, a platform extending toward the device, and a plurality of continuously operating endless spaced conveying elements moving horizontally over the platform toward the crop-treating device for conveying crops along the platform to the crop-treating device, of a plurality of operative crop lifter fingers for raising the crops from conveying contact with the conveying elements to stop the conveying of crops to the device, said fingers arranged in a number of rows crosswise of the conveying elements and movable from points between the runs of the conveying elements.

10. The combination with a crop-treating device, a platform extending toward the device, and a plurality of continuously operating, spaced, conveying elements moving over the platform toward the crop-treating device for conveying crops along the platform to the crop-treating device, of a plurality of crop-lifting members positioned between the conveying elements and normally below the platform during conveying of crops to the crop-treating device, and means for elevating the crop-lifting members above the platform to cause them to lift the crops out of conveying contact with the conveying elements for stopping the conveying of crops toward the crop-treating device.

11. The combination with a crop-treating device, a platform extending toward the device, and a plurality of continuously operating, spaced, conveying elements moving over the platform toward the crop-treating device for conveying crops along the platform to the crop-treating device, of a plurality of crop-lifting members positioned between the conveying elements and normally below the platform during conveying of crops to the crop-treating device, a gate, and means for placing the gate across the platform to stop the conveying of crops beyond the gate toward the device and for simultaneously elevating the crop-lifting members above the platform to cause them to lift the crops out of conveying contact with the conveying elements for stopping the conveying of crops toward the crop-treating device.

12. The combination with a crop-treating device, a platform extending toward the device, and a plurality of continuously operating, spaced, conveying elements moving over the platform toward the crop-treating device for conveying crops along the platform to the crop-treating device, of a plurality of crop-lifting members positioned between the conveying elements and normally below the platform during conveying of crops to the crop-treating device, a gate, and means for placing the gate across the platform at a point near but spaced from the device to stop the conveying of crops beyond the gate toward the device and for simultaneously elevating the crop-lifting members above the platform to cause them to lift the crops out of conveying contact with the conveying elements for stopping the conveying of crops toward the crop-treating device.

13. The combination with a crop-treating device, a platform extending toward the device, and a plurality of continuously operating, spaced, conveying elements moving over the platform toward the crop-treating device for conveying crops along the platform to the crop-treating device, of a plurality of crop-lifting members positioned between the conveying elements and normally below the platform during conveying of crops to the crop-treating device, a gate pivoted at a point at the side of the platform and spaced from the crop-treating device and normally extending alongside the platform toward the device during conveying of crops to the device, and means for swinging the gate across the platform spaced from the device to sweep crops on the platform back from the device and to prevent crops from passing beyond the gate toward the device, and for simultaneously elevating the crop-lifting members above the platform to cause them to lift the crops out of conveying contact with the conveying elements for stopping the conveying of crops toward the crop-treating device.

14. The combination with a crop-treating device, a platform extending to the device, and a plurality of continuously operating, spaced, conveying elements moving over the platform to the device for conveying crops over the platform to the device, of a plurality of rock-shafts extending below the platform transversely to the direction of flow of crops and spaced from one another in the direction of said flow, a plurality of crop-lifting members secured to each shaft and normally positioned below the platform during flow of crops toward the device, and means for angularly shifting the rock-shafts to raise the crop-lifting members above the platform for lifting the crops from conveying contact with the conveying elements.

15. The combination with a crop-treating device, a platform extending to the device, and a plurality of continuously operating, spaced, conveying elements moving over the platform to the device for conveying crops over the platform to the device, of a plurality of rock-shafts extending below the platform transversely to the direction of flow of crops and spaced from one another in the direction of said flow, a plurality of crop-lifting members secured to each shaft and normally positioned below the platform during flow of crops toward the device, a rock-shaft positioned at the side of the platform and extending upwardly therefrom, a gate secured to the rock-shaft, and means for angularly shifting the rock-shaft to move the crop-sweeping members across for stopping the flow of crops therebeyond toward the device and for simultaneously angularly shifting the plurality of rock-shafts to raise the crop-lifting members above the platform for lifting the crops from conveying contact with the conveying elements to stop the flow of crops along the platform.

16. The combination with a crop-treating device, a platform extending to the device, and a plurality of continuously operating, spaced, conveying elements moving over the platform to the device for conveying crops over the platform to the device, of a plurality of rock-shafts extending below the platform transversely to the direction of flow of crops and spaced from one another in the direction of said flow, a plurality of crop-lifting members secured to each shaft and normally positioned below the platform during flow of crops toward the device, a rock-shaft positioned at the side of the platform and spaced from the device and extending upwardly therefrom, a plurality of crop-sweeping members secured in spaced relation along the length of the rock-shaft, and means for angularly shifting the rock-shaft to move the crop-sweeping members across the platform at a point spaced from the device for sweeping the crops back from the device along the platform, and for stopping the flow of crops therebeyond toward the device and for simultaneously angularly shifting the plurality of rock-shafts to raise the crop-lifting members above the platform for lifting the crops from conveying contact with the conveying elements to stop the flow of crops along the platform.

17. The combination with a crop-treating device, a platform extending to the device, and a plurality of continuously operating, spaced, conveying elements moving over the platform to the device for conveying crops over the platform to the device, of a plurality of rock-shafts extending below the platform transversely to the direction of flow of crops and spaced from one another in the direction of said flow, a plurality of crop-lifting members secured to each shaft and normally positioned below the platform during flow of crops toward the device, each member being composed of a first portion secured to the shaft and a second portion extending at an obtuse angle from the first portion, and means for angularly shifting the rock-shafts to raise the crop-lifting members to bring the second portions of the members above and parallel to the platform for lifting the crops from conveying contact with the conveying elements.

18. The combination with a crop-treating device, a platform extending to the device, and a plurality of continuously operating, spaced, conveying elements moving over the platform to the device for conveying crops over the platform to the device, of a plurality of rock-shafts extending below the platform transversely to the direction of flow of crops and spaced from one another in the direction of said flow, a plurality of crop-lifting members secured to each shaft and normally positioned below the platform during flow of crops toward the device, each member being composed of a first portion secured to the shaft and a second portion extending at an obtuse angle from the first portion, a rock-shaft positioned at the side of the platform and spaced from the device and extending upwardly therefrom, a plurality of crop-sweeping members secured in spaced relation along the length of the rock-shaft, and means for angularly shifting the rock-shaft to move the crop-sweeping members across the platform at a point spaced from the device for sweeping the crops back from the device along the platform, and for stopping the flow of crops therebeyond toward the device and for simultaneously angularly shifting the plurality of rock-shafts to raise the crop-lifting members to bring the second portions of the members above and parallel to the platform for lifting the crops from conveying contact with the conveying elements to stop the flow of crops along the platform.

CLEMMA R. RANEY.
RUSSELL R. RANEY.

CERTIFICATE OF CORRECTION.

Patent No. 2,369,754.  February 20, 1945.

CLEMMA R. RANEY, ET AL.

It is hereby certified that error appears in the printed specification of the above numbered patent requiring correction as follows: Page 4, second column, line 23, claim 15, strike out the words "crop-sweeping members across" and insert instead --gate across the platform and--; and that the said Letters Patent should be read with this correction therein that the same may conform to the record of the case in the Patent Office.

Signed and sealed this 19th day of June, A. D. 1945.

Leslie Frazer (Seal)  Acting Commissioner of Patents.